3,672,954
PROCESS FOR PREPARING DEPROTENIZED BLOOD EXTRACTS HAVING A HEALING ACTION AND PRODUCT OBTAINED THEREBY

Leonida Grippa, Nettuno, Italy, assignor to Istituto Nazionale Chimico Biologico S.r.l., Rome, Italy
Filed Aug. 20, 1969, Ser. No. 851,593
Claims priority, application Italy, Nov. 2, 1968, 40,904/68
Int. Cl. C07g 7/00
U.S. Cl. 195—29                                  6 Claims

ABSTRACT OF THE DISCLOSURE

A process for preparing deproteinized blood extracts having a healing action which comprises the sequential steps of subjecting, after filtration, hemolyzed and defibrinated blood of animals just slaughtered, to enzymatic hydrolysis, deproteinizing the hydrolysate obtained by heating followed by an immediate cooling and then filtering, and after concentration or lyophilization of the filtrate, deproteinizing further the product with alcohol, removing the lipids therefrom in an organic solvent, purifying, removing histamine therefrom and drying under vacuum the extract obtained.

---

Figure 1:
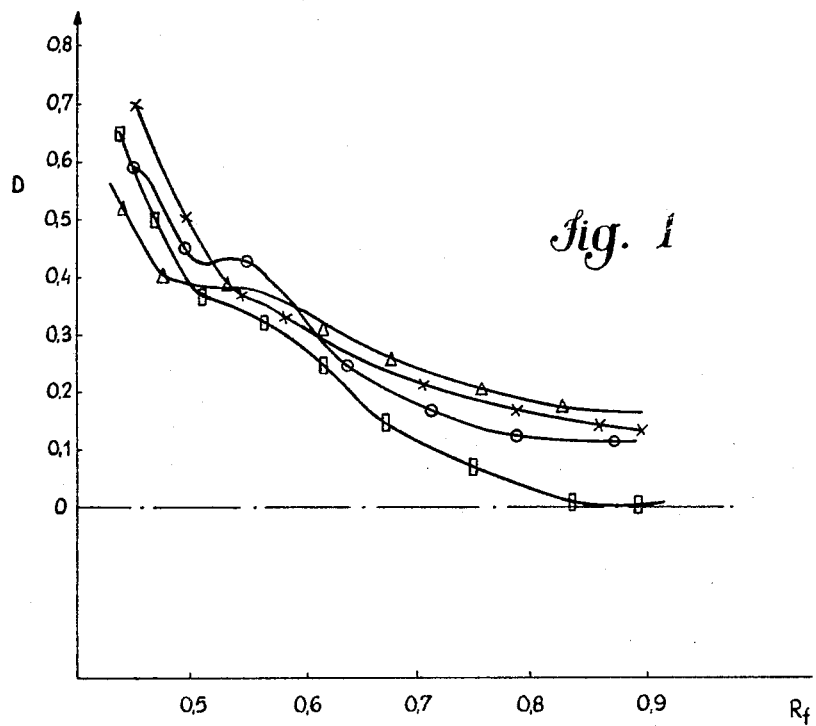

The present invention relates to a process for preparing deproteinized blood extracts and the product obtained thereby. More particularly according to the process of the invention on hemolized and defibrinated mixed blood of bovine and equine sources an enzymatic hydrolysis is carried out followed by a deproteinization heat treatment.

By such a method, blood extracts are obtained containing polypeptide chains which by helping the development of the protein syntheses in the tissues, promote the healing thereof.

The first epxeriments for obtaining from animal blood extracts products deriving from the splitting of the proteins of which it consists date back to 1919. In particular the first mentions to the action of either hemolyzed or autolyzed blood extracts are given respectively in Physiol. Abstr. 4,464 and H. Roger de med. exp. 27,325—1919. Afterwards in 1922 (U.S. Pat. 1,403,892, Jan. 17, 1922) experiments were carried out on the hydrolysis of blood and hemoglobin proteins by means of organic acids and pepsin.

The preparation of extracts by a process based on the action of carbon dioxide with fragmentation and extraction of different biological substrates such as blood, marrow and spleen (fresh blood) and the testing of such extracts in the physiological field are described in British Patent 333,159 dated Apr. 2, 1929 in the name of Société Anonyme pour l'Industrie Chimique, while still later in 1929 (H. Bierry Compt. Rend. Soc. Biol. 101, 20, 1929) reports where made on the breaking down of the plasma proteins with hot HCl or KOH and on the extraction of the plasma sugars.

In other studies in 1935 and 1937 wide mention is made of influence of blood extracts, on the reproduction rate of some vegetal tissues (Proc. Ind. Academy of Sciences, 1B, 381, 1935) and of the ability of such extracts to produce antigonadotropic substances (Chinese Journal of Physiology 11,329, 1937).

More recent are some studies on the use of hydrolizates with HCl as tonics (I. Marinescu—Lucrarele Institut Cercatari Alem. 1, 11–28, 1957), on the effect of hydrolizates of platelets on the respiratory metabolism (Kazuo Okada—Osaka Daigaku Igaku Jasshi 10, 1511; 1958) and on the use of such blood extracts as accelerators of the lipid metabolism (H. P. Kaufmann, Felte, Seifen, austrichmittel 63,331-4, 1961). The same problem is more widely developed and described in Japanese Patent 279,556 in the name of Zork A.G., filed on Dec. 13, 1956 claiming the priority of the German patent application J 11,046 in the name of Karl Heinz Jäger, where the operation of preparing the blood extract is carried out by dialysis. Others have studied the problem of such an extraction by the use of ion exchange resins (Bollettino Chimico Farmaceutico vol. 101—1962).

The main conclusions which can be reached on the basis of said technological literature can be summarized under the following points:

(a) Blood of animal origin as stock material from which to obtain simpler products ("extracts") derived from the splitting of its protein components has been used in the therapeutical field both as such, that is, as whole blood and in its different component parts.

Autolysates obtained from fresh blood, hemolyzed blood, blood plasma, blood serum, red blood corpuscles, hemoglobin, and platelets are well known. In short in the production of these autolysates each part of the liquid tissue (blood) has undergone a hydrolysis with formation of products having different characteristics and purposes.

(b) The chemical processes of blood treating followed hitherto are based substantially on different hydrolysis techniques carried out individually with:

$CO_2$ (carbon dioxide)
Inorganic acids (HCl)
Inorganic bases (sodium or potassium hydroxide)
Pepsin (pure enzyme)
Pepsin and trypsin used individually as pure enzymes or in admixture.

In the different processes mentioned hereinabove, chemical-physical conditions (time, temperature, etc.) of attack suitable for obtaining blood extracts having particular properties have been determined from time to time; however with the common criterion of achieving, in any case, an end product of the blood which retains, as much as possible, the base composition and the relative therapeutical properties.

However, it is to be pointed out that these properties result from the combination of a plurality of therapeutic actions each attributable to the different substances present in the whole blood.

On the basis of such a consideration the previous studies and experiments have been directed to recover these different substances from the blood or to succeed in producing extracts richer in these constituents than in others. In effect, vasodilator, hypotensor, hypertensor substances, preparations which further the action of the antibiotics or promote the growth of ferments or bacteria, or hormonal substances proper have been recovered from blood and introduced in therapy. In particular many works and studies have been brought to completion to obtain from blood substances which were capable of increasing the oxidative metabolism of the cells in tissues affected by necrosis. In this connection mention is to be made of the above cited Japanese patent 279,556 (Zork A. G.). However, it is here important to remark that such studies have had as their purpose the attainment not just of individual substances recovered from blood, but rather a particular extract of whole blood of bovine cattle for slaughter, treated prior to slaughtering with particular chemical or physical processes.

The result, as has been stated by the same Zork A. G. in the above cited Japanese patent, is the discovery of substances contained in the blood, stimulating the respiration and reactivating the metabolism, the existence of which in the whole blood or the plasma was difficult to prove.

In fact, these substances, although already contained in the blood, were present in a combined or inactive form of which it was not possible therefore to prove the therapeutic activity, but of which the recovery and concentration in an injectable form was important. According to the above cited Zork A. G. Japanese patent, to this end a process for obtaining a blood extract has been devised, which comprises the steps necessary to permit the gradual liberation from their combined or inactivated forms, of those thermolabile substances contained in the original whole blood, such substances being considered as the factors to which the therapeutical action of respiration stimulation was to be attributed. On this basis the method followed in Zork A. G. Japanese patent has led to the production of a blood extract in which are contained entire and free those substances which already existed in whole blood or in fractions thereof.

Unlike what was previously known, it has been found according to the present invention that a blood extract having an improved healing activity on wounds, sores and ulcera can be obtained, if in the blood, after its drawing out from animals, the formation of the necessary active principles is brought about.

The basic principle on which this invention is based consists essentially in the observation that such components do not pre-exist in the blood, neither in the combined form nor in the active one, but they form on the contrary as a result of the particular process hereinafter set forth which permits the formation thereof in a heat-stable and analytically controllable form.

It is therefore a main object of the invention to provide a process which does not consist in liberating and recovering from blood thermolabile substances contained therein, but in inducing in the blood of animals, in particular horses, the formation of thermostable substances and principles having a well defined therapeutical activity, namely the rapid healing of ulcered tissues. In fact, these thermostable principles are the constituent bases of the protein molecules which must reform the new tissue in place of the necrosed one.

It has now been found according to the invention that by offering to the necrosed tissue the possibility of "starting" for the protein synthesis no longer from simple amino acids, but from a plurality of bound amino acids (polypeptides) already predisposed for a further formation of the final chain, presumably by bonding with other polypeptide fragments, a ready reactivation of the capacity of protein synthesis of the affected tissue is brought about. In particular it has been found after a careful examination of the numerous enzymatic lyses practically utilizable that the carrying out of an enzymatic lysis with papain in technologically suitable conditions brings about in the blood extract of the invention the formation of said polypeptide chains.

It is therefore a specific object of the present invention to provide a process for preparing deproteinized blood extracts having a healing action, comprising the sequential steps of collecting blood of just slaughtered animals, in particular mixed blood of bovine and equine cattle, hemolyzing, defibrinating and filtering it, subjecting the filtrate obtained to enzymatic hydrolysis, deproteinizing the hydrolysate by heating to 80° C. (176.0° F.) followed by immediate cooling and filtration, concentrating or lyophilizing filtrate under vacuum, cold-deproteinizing further the product with ethanol, filtering the alcohol solution and concentrating to remove the ethanol, diluting the filtrate, removing the lipids with chloroform, dehistaminizing, purifying and drying under vacuum.

In particular the blood, preferably mixed blood (bovine and equine) drawn immediately upon the slaughtering of the animals, is collected in stainless steel sterile vessels.

After withdrawing, the blood hemolized is brought to the plant and defibrinated, it being remarked that the hemolysis in the process according to the invention, is carried out by known techniques by adding to the blood apyrogenic distilled water and stirring until hemolysis occurence. The water to blood ratio can be set at 1/1.

The blood thus recovered is caused to flow through clarifying and sterilizing Seitz filters, so as to obtain a clear liquid ready to be subjected to the subsequent treatments the first of which is the enzymatic hydrolysis.

Such a hydrolysis is carried out in stainless steel tanks at optimum temperature by using as enzyme the papain. Said temperature is that at which the enzyme has its maximum activity in the presence of a given concentration of substrate and in the case at issue it ranges from 35° to 42° C. (95.0–107.6° F.), the pH having been adjusted within the range from 5 to 5.5. The pH adjustment at these values is particularly important both for the enzyme activity and for the properties of the end product.

The dry residue has an ash content of about 4%, whereas on the contrary extracts obtained by enzymatic lyses with other enzymes (pepsin, trypsin) employed alone or in combination have ash contents ranging from 10 to 20%. On the other hand obviously the product obtained by papain attack has a peculiar composition of its own both as to the type and as to the percentage of peptides and aminoacids, owing to the absolute specificity of the polypeptide bonds split by the papain. In fact it is known that each proteolytic enzyme acts specifically by attacking and splitting only determinate points of the protein molecule with a resulting different final content of specific peptides.

After the lapse of a certain time, the liquid hydrolyzed and adjusted to a suitable pH value is subjected to a rapid heating at 80° for a first deproteinization.

In fact it has been found according to the invention that the hydrolyzed liquid can be subjected to a rapid heating (it being excluded that the activity of the healing preparation is attributable to the thermolabile products formed during the enzymatic hydrolysis.

In particular it has been observed that only the thermostable products derived from the papain enzymatic lysis have importance for the therapeutical purposes of our extract and that the destruction, obtained by heating, of all the thermolabile substances is necessary for the therapeutical use of the product.

Therefore, unlike other known processes, according to the invention resort is had to a heating of the mass up to 80°, followed by an immediate cooling, in a mechanical cooler, and subsequent filtration on Seitz filters.

The filtrate thus obtained is concentrated under vacuum at low temperature until its volume is reduced to one twentieth of its original volume.

At this point resort can be had to lyophilization rather than to a concentration under vacuum, however the choice of either process is not essential for the purposes of the invention.

On the concentrated product thus obtained, a further cold deproteinization is carried out by means of subsequent treatments with ethanol at 40, 60 and 70 proof, which treatments are commonly used for precipitating proteins in solution.

The alcohol solution, after filtration, is again concentrated under vacuum until the ethanol is removed and subsequently diluted with apyrogenic distilled water and filtered in a Seitz filter-press.

Thereafter a removal of the lipids is carried out by a shaking treatment in separatory funnels (of stainless steel) with subsequent portions of chloroform, and the removal of the chloroform layers is effected.

This treatment with chloroform has a particular importance in the process of the invention.

In fact by means of it, it is possible to influence the purity characteristics of the product to the ends of its therapeutical use.

The volumes of chloroform with which the extract is treated must be sufficient to wet it thoroughly and even to provide an excess. For example, 500 g. of extract are treated subsequently with 1.5 l. of chloroform.

The last step of the process is the one which conditions the end product as to its composition and the absence in it of substances of toxic nature which would limit the use thereof by the injectable (intravenous) route. This step consists in fact in a passage of the product through an ion exchange resin. To this end the product is dissolved in water to obtain a water solution having a suitable concentration, which solution is caused to flow slowly through a glass column containing Amberlite I.R.–120 resin in granules or through another type of a similar resin.

The Amberlite I.R.–120 resin is a resin of strong cationic type: it absorbs all the free aminoacids and, when thoroughly saturated, it releases gradually the more acidic ones, then the less acidic ones, then the neutral ones, until finally only dibasic aminoacids are retained. In this way the final composition of the extract after passage through said resin is substantially modified and it does not contain, even in an extremely small percentage, toxic histamine nor even the histamine-like aminoacids.

The liquid obtained after the passage through the resin is then filtered through sterilizing and apyrogenic filters.

This step is followed by a drying under vacuum at low temperature.

The extract thus obtained is ready to be suitably diluted until a final solution is obtained which after filtration is vialed and sterilized in an autoclave at 120° for 30 minutes without difficulty owing to the thermostability of the product under consideration. Finally an analysis of the product is carried out.

Said analysis, besides for the final control of the product, serves also to prove that the process used for the preparation of this blood extract from a papain lysis, effects a polypeptide concentration peculiar of the product. Therefore, 0.1 ml. of a water solution of the extract having a concentration ranging from 0.5 to 5% is applied at the starting point of a chromatographic plate prepared as follows:

A Sephadex G25 (SG25) gelatin is suspended in a buffer solution, for example a phosphate, 0.02 M solution having a pH of 6.8. About 50 ml. of buffer per g. of Sephadex are used. The gel is washed several times by settling, leaving the SG25 for at least 48 hours in contact with the buffer solution.

At this point the plates are prepared by settling, then removing the excess solvent with filter paper and the paper chromatography is carried out according to known techniques.

The results of the paper chromatographic tests are given in FIG. 1 of the attached drawing showing a diagram where on the abscissa are given the values of the migration rate Rf (migration of the different chromatographic zones with respect to the eluent flow) proportional to the molecular weights of the different polypeptide fractions of the extract, and on the ordinate the values of the optical density of said polypeptide fractions.

Said diagrams must be read by comparison with a prepared calibration diagram.

In fact some pure substances having a known molecular weight and within the range from 200 to 4000 are provided and chromatographed on Sephadex 25 gel.

The development is carried out by means of the Paulys reagent.

For example Tyrosine M.W. 180; Tyrosyl-leucyl-glycyl-glutamylphenylalanine M.W. 800; Plastein M.W. 1500; Serine M.W. 4000 are provided.

By knowing the Rf of each of these substances a calibration curve can be formed.

Then the solution of the extract is chromatographed in the way above described and curves like those shown in the diagram (FIG. 1) are obtained.

Each of the four curves shown in said diagram refers to a particular measurement carried out on a blood extract according to the invention, it being remarked that the differences between the individual curves depend on those little diversities of composition ever present between different samples of a same biological product.

In the diagrams are shown:

(a) A typical percent composition (in polypeptides) having a M.W. within the range from 500 to 3,500 ($Rf=0.9$), a maximum within the range from 500 ($Rf=0.5$) to 1000 ($Rf=0.6$) specific of the papain hydrolysate.

(b) Absence of substances having a M.W. higher than 3500 ($Rf=0.9$) and this means that the extract cannot give rise to reactions of the anaphylactic shock type.

In case it is desired to attain a more exact evaluation of the quantitative composition of the extract with definition of the rate of distribution of the molecular weights of the different polypeptides a filtration on gel (dextran copolymerized with epichlorohydrin) can be carried out and afterwards a separation of the water soluble molecules having a different molecular weight by selective adsorption in the gel pores.

The technique followed is the well-known one of column chromatography from the result of which a determination of the molecular weight is subsequently carried out.

ANALYSIS

The analysis of a blood extract obtained by subjecting mixed blood of two animal species (bovine and equine) to hemolysis and hydrolysis. The solution to be analyzed (in a maximum amount of 3 ml.) must be introduced at the top of the column in the following way: first of all the liquid over the column is removed by a pipette leaving a layer of 1–2 mls. Such a liquid is then allowed to flow through the column and at the time at which the gel upper layer starts to cover, the liquid flow is discontinued by shutting the lower tap of the column and the test solution is added.

Then the flow of the liquid is resumed and thus the solution is absorbed by the upper layer of gel. At this point the column is connected to the eluent reservoir and the analysis is started.

By using as eluent 0.2 M acetic acid, the optical density of the solution is read coninuously by means of a Beckmann DU spectrophotometer provided with a 1 ml. flow cell, at the wavelength of 280 m$\mu$. With a Sephadex G–25 bed having a length of about 200 cm., the substances excluded (those having a molecular weight higher than 5000) issue after 30 ml., whereas the substances more strongly adsorbed, that is the $NH_4^+$ ions and glycerol, issue after about 100 ml. of eluent.

Therefore, all the peptides having an intermediate molecular weight, which are of interest to the analysis, issue between 30 and 1000 and are to be collected.

DETERMINATION OF THE MOLECULAR WEIGHT

All the fractions are collected by means of an automatic fraction-collector, adjusted at 5 ml., in test tubes the weight of which has been previously determined.

After completion of the analysis (optical density equal to that of the solvent in the Beckmann DU apparatus) all the test tubes are transferred to a lyophilizer and their contents are carefully dried.

It is essential that a complete removal of the solvent be effected; therefore the drying is continued on $P_2O_5$ in a vacuum desiccator for 7 days. By an additional weighing the weight of the dry residue in each test tube is deduced and the molecular weight thereof is determined, after dissolution in 0.5 ml. of distilled water, in an automatic osmometer.

Figure 2:
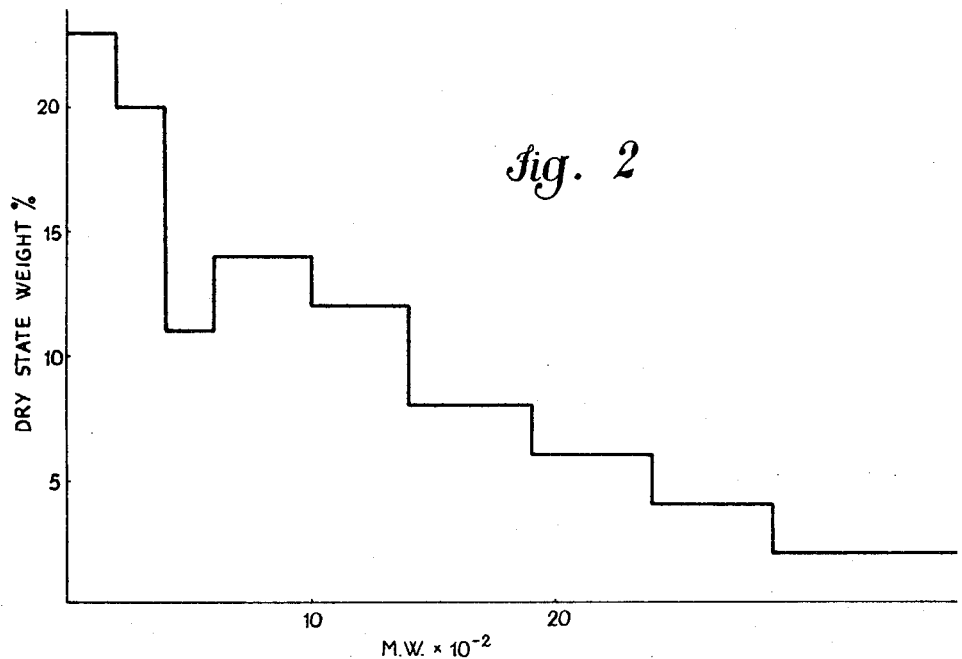

Values of molecular weight (M.W.$\times 10^{-2}$) which are plotted in an increasing order on the abscissa of a diagram which on the ordinate shows the weight (dry percent weight) of each of the fractions to which each give molecular weight corresponds. In such a way the desired outline of the percent composition of the extract as a function of the molecular weight of the different fractions is obtained. Such results are shown in FIG. 2 of the attached drawing.

I claim:

1. A process for preparing deproteinized blood extracts having a healing action on uclered tissues, starting from filtrated, hemolized and defibrinated blood of animals just slaughtered, comprising the steps of heating said blood in admixture with papin at a temperature ranging from 35° to 42° C. at a pH 5 to 5.5 thereby to effect enzymatic hydrolysis of said blood, separating thermolabile substances from the hydrolysate heating at a temperature of 80° C. and immediately cooling and then filtering the hydrolysate, concentrating the filtrate to a volume of 1/20 of the original volume, deproteinizing the concentrate by contacting the same with alcohol, removing lipids from the concentrate by contacting the same with chloroform, removing histamine from the concentrate on a cationic exchange resin, and drying under vacuum the extract obtained.

2. Process as claimed in claim 1, wherein the deproteinization is carried out by successive treatments with ethanol at proofs 40, 60 and 70.

3. Process as claimed in claim 2, wherein said ethanol is removed under vacuum, the concentrate diluted with pyrogen-free distilled water and filtered on a Seitz filter.

4. Process as claimed in claim 1, wherein the amount of chloroform is about 1.5 liters for 500 g. of extract.

5. Process as claimed in claim 1, wherein the blood to be treated is a mixture of equine blood and bovine cattle blood collected immediately after the slaughtering of the animals.

6. Deproteinized blood extracts for healing ulcered tissues prepared as claimed in claim 1.

References Cited

UNITED STATES PATENTS 2,901,396   8/1959   Lewis et al. _____ 195—29

FOREIGN PATENTS 629,888   10/1961   Canada _____ 424—101

OTHER REFERENCES

Alexander et al.: "Analytical Methods of Protein Chemistry,' vol. 1, 1960, pp. 73–76.

A. LOUIS MONACEL, Primary Examiner

M. D. HENSLEY, Assistant Examiner

U.S. Cl. X.R.

195—2; 424—95; 260—112 B